United States Patent
Kim et al.

Patent Number: 5,757,778
Date of Patent: May 26, 1998

[54] APPARATUS FOR TESTING PROTOCOLS AND TRAFFICS IN BROADBAND INTEGRATED SERVICES DIGITAL NETWORKS AND THE METHOD THEREOF

[75] Inventors: Weon-Soon Kim; Meong-Seok Kim; Beom-Ki Hong, all of Yusong-ku; Joon-Weon Lee, Seo-ku, all of Rep. of Korea

[73] Assignees: Electronics and Telecommunications Research Institute, Daejeon; Korea Telecommunication Authority, Seoul, both of Rep. of Korea

[21] Appl. No.: 761,494

[22] Filed: Dec. 6, 1996

[30] Foreign Application Priority Data

Dec. 19, 1995 [KR] Rep. of Korea ............... 95-52161

[51] Int. Cl.$^6$ ............................................. H04J 3/14
[52] U.S. Cl. ........................................ 370/252; 370/250
[58] Field of Search ............................ 370/241, 242, 370/243, 244, 245, 246, 247, 248, 249, 250, 251, 252, 253, 465, 467, 466, 522, 395, 396, 397, 398, 399, 503, 509, 516; 375/362

[56] References Cited

U.S. PATENT DOCUMENTS

| | | | |
|---|---|---|---|
| 5,251,204 | 10/1993 | Izawa et al. | 370/251 |
| 5,313,453 | 5/1994 | Uchida et al. | 370/250 |
| 5,390,163 | 2/1995 | Itoh et al. | 370/250 |
| 5,450,394 | 9/1995 | Gruber et al. | 370/253 |
| 5,457,700 | 10/1995 | Merchant | 370/253 |
| 5,500,851 | 3/1996 | Kozaki et al. | 370/250 |
| 5,504,754 | 4/1996 | Grünenfelder | 370/250 |
| 5,513,191 | 4/1996 | Takechi et al. | 370/242 |
| 5,602,826 | 2/1997 | Yoshimura et al. | 370/248 |
| 5,610,913 | 3/1997 | Tomonaga et al. | 370/253 |

*Primary Examiner*—Wellington Chin
*Assistant Examiner*—Huy D. Vu
*Attorney, Agent, or Firm*—Antonelli, Terry, Stout & Kraus, LLP

[57] ABSTRACT

The present invention provides an apparatus and a method for testing protocol and traffic levels in broadband integrated services digital networks(B-ISDNs). The apparatus includes a test control block for receiving a test cell traffic transmission request signal from a test function user block, formatting a cell to be transmitted and generating an ATM cell, receiving the ATM cell based on an ATM cell reception display signal and controlling an operation mode to thereby test the protocol and traffic levels; a test traffic transmission block for receiving the ATM cell generated by the test control block and setting an operation mode based on the operation mode set request signal from the test control block; a test traffic reception block for receiving the ATM cell which is synchronized with a byte clock, setting a time stamp for displaying the received time, processing the time stamp to the test control block, and setting an operation mode based on the operation mode set request signal from the control block; and a cable connection block for receiving the ATM cell generated by the test traffic transmission block and outputting it to each port in a line interface port interface, receiving the ATM cell from each of the ports, and then synchronizing the ATM cell with a byte clock to thereby output it the test traffic reception block.

6 Claims, 5 Drawing Sheets

1

APPARATUS FOR TESTING PROTOCOLS AND TRAFFICS IN BROADBAND INTEGRATED SERVICES DIGITAL NETWORKS AND THE METHOD THEREOF

FIELD OF THE INVENTION

The present invention relates to an apparatus for testing protocol and traffic in broadband integrated services digital networks(B-ISDNs) and a method thereof. More particularly, the invention relates to an apparatus and a method which are capable of effectively implementing the testing of protocol and traffic in a system which is connected utilizing a user-network interface transport method in the B-ISDNs.

DESCRIPTION OF THE PRIOR ART

In testing of broadband integrated services digital networks(B-ISDNs) apparatus, there are a number of problems including for instance, installation of a test system for testing the apparatus or design for a desired operating environment in view economic and time constraint. To overcome such drawbacks, therefore, a test apparatus is need to perform a relative function and to generate test events with respect to a test object system.

The test apparatus functions as a reference test apparatus for testing protocol and traffic involved in certain apparatus, which is coupled with the broadband integrated services digital network user-network interfaces. Such test apparatus requests a module technique capable of installing the apparatus according to testing objects. Furthermore, such apparatus basically should include a test function for identifying interoperability between protocol levels and between traffic levels.

SUMMARY OF THE INVENTION

It is, therefore, a primary object of the invention to provide an apparatus for testing protocol and traffic in broadband integrated services digital networks(B-ISDNs) and a method thereof, which is capable of providing a test system to be applied to a user-network interface broadband integrated services digital network having a test function for interconnection protocol by connecting in various physical media using ATM method, and performing coordination testing for protocol events by applying an interconnection test involved in data transmission, and executing traffic testing through the ATM connection for transmitting user data.

In accordance with one aspect of the invention, there is provided an apparatus for testing protocol and traffic in broadband integrated services digital networks(B-ISDNs), which comprises:

test control means for receiving a test cell traffic transmission request signal provided from a test function user section, formatting a cell to be transmitted and generating an ATM cell, receiving the ATM cell based on an ATM cell reception display signal, and controlling an operation mode to thereby test the protocol and the traffic;

test traffic transmission means for receiving an ATM cell generated by the control means, outputting the received ATM cell, and setting an operation mode based on the operation mode set request signal provided from the control means;

test traffic reception means for receiving an ATM cell which is synchronized with a byte clock in response to a received control signal, setting a time stamp for displaying the received time, processing the time stamp to the control means, and setting an operation mode based on the operation mode set request signal provided from the control means; and line interface means for receiving the ATM cell generated by the test traffic transmission means and outputting it to a plurality of ports in a line interface port interface, receiving the ATM cell from the plurality of ports, and then synchronizing the ATM cell with a byte clock to thereby output it the test traffic reception means.

In accordance with another aspect of the invention, there is provided a method employed in an apparatus for testing protocol and traffic in broadband integrated services digital networks(B-ISDNs), wherein the apparatus includes: test control means for receiving a test cell traffic transmission request signal provided from a test function user part, formatting a cell to be transmitted, generating an ATM cell, receiving the ATM cell based on an ATM cell reception display signal, and controlling an operation mode to thereby test the protocol and the traffic; test traffic transmission means for receiving an ATM cell generated by the control means, outputting the received ATM cell, and setting an operation mode based on the operation mode set request signal provided from the control means; test traffic reception means for receiving an ATM cell which is synchronized with a byte clock in response to a received control signal, setting a time stamp for displaying the received time, then processing generating the time stamp to the control means, and setting an operation mode based on the operation mode set request signal provided from the control means; and line interface means for receiving the ATM cell generated by the test traffic transmission means, outputting it to respective ports in a line interface port interface, receiving the ATM cell from the respective ports, and then synchronizing the ATM cell with a byte clock to thereby output it the test traffic reception means, said method comprising the steps of:

(a) setting a mode which operates on a system initialize module to initial hardware and software thereof, receiving a test cell traffic transmission request signal, formatting a cell to be transmitted to thereby provide an ATM cell to the test traffic transmission means, receiving the ATM cell generated by the test traffic reception means and checking an operation mode input thereto, performing the operation of a corresponding mode, and receiving a operation mode set request signal to set operation modes of the respective means;

(b) setting a mode which operates on a system initialize module to initial hardware and software thereof, receiving an ATM cell traffic transmission request signal generated by the test control means, passing the received ATM cell to the line interface means, and receiving a operation mode set request signal to thereby set operation modes of the respective means; and (c) setting a mode which operates on a system initialize module to initial hardware and software thereof, receiving an ATM cell generated by the line interface means, attaching a time stamp for displaying a received time, passing the received ATM cell to the test control means, and receiving a operation mode set request signal to thereby set operation modes of the respective means.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
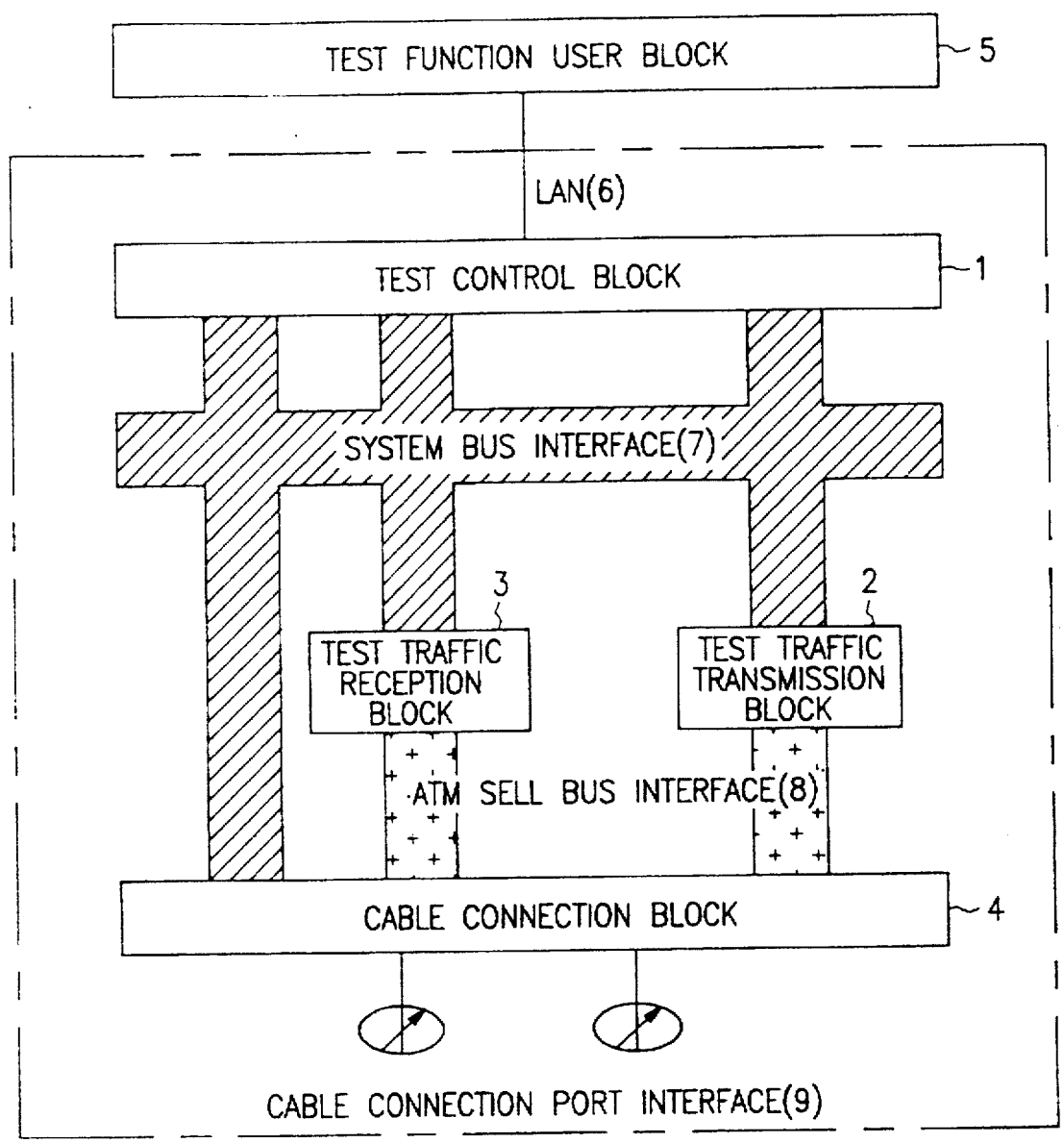
FIG. 1 depicts a schematic block diagram of the inventive apparatus for testing protocol and traffic in broadband integrated services digital networks(B-ISDNs)

Referring to FIG. 1, there is shown a schematic block diagram of the inventive test apparatus for testing protocol and traffic in broadband integrated services digital networks (B-ISDNs), which comprises a test control block 1 for controlling a protocol process, a protocol test function and an user interface, a test traffic transmission block 2 for transmitting test traffic, a test traffic reception block 3 for receiving the test traffic and the line interface block 4 which serves as a physical interface for a test object system.

In the above blocks, the interconnection between the test function user block 5 and the test control block 1 is achieved through the use of a LAN 6, and interconnection between blocks within the apparatus is accomplished by two interfaces, one of which is a system bus interface 7 for receiving and transmitting the test traffic as a VME interface and the other is an ATM cell bus interface 8 being operated in service clocks. In addition, interconnection between the test apparatus and a test object system is realized by a line interface port interface 9 as an outer interface, which is provided with a larger number of ports as a module concept to increase a capacity of the test apparatus. A physical medium of the line interface block 4 may be constituted so that it is possible to connect with various physical mediums such as a single mode optical fiber, and hence, a multi-mode optical fiber.

Operation of the test apparatus of the present invention will be described bellow.

First, the test control block 1 set a basic mode which operates on a system initial module to initial hardware and software thereof. Thereafter, the test control block 1 receives a test cell traffic transmission request signal generated by the test function user block 5 and formats a test cell to be transmitted, to thereby provide the formatted ATM cell to the test traffic transmission block 2.

In addition, the test control block 1 receives a reception display signal for the ATM cell from the test traffic reception block 3. In this case, when a operation mode of the received ATM cell is a monitor mode, it decodes the received ATM cell and displays on user monitor, and when that of the received ATM cell is a transmission mode it delivers the ATM cell to the test function user block 5.

Furthermore, if the test control block 1 receives an operation mode set request signal, the test control block 5 sets operation modes involved in each of the blocks in the system.

The test traffic transmission block 2, sets a basic mode which operates on a system initialize module set to initial hardware and software thereof. Thereafter, the test traffic transmission block 2 receives an ATM test cell transmission request signal generated by the test control block 1 and outputs the ATM cell to the line interface block 4 with byte clocks of the line interface block 4. The test traffic transmission block 2 receives the operation mode set request signal from the test control block 1 and sets an operation mode associated with its signal.

Similarly, the test traffic reception block 3 sets a basic mode which operates on a system initial module to initialize hardware and software thereof. Thereafter, the test traffic reception block 3 receives the ATM cell synchronized with the byte clock through control of the line interface block 4, and defines a time stamp for displaying a received time, and then transfers the ATM cell to the test control block 1.

Likewise, the test traffic reception block 3 receives the operation mode set request signal from the test control block 1 and set an operation mode associated with its signal.

The line interface block 4 receives the ATM cell introduced from the test traffic transmission block 2 and outputs the ATM cell to each of the ports in the line interface port interface 9. The line interface block 4 receives the ATM cell retrieved from the respective port and generates the ATM cell to the test traffic reception block 3 by synchronizing with the byte clock.

Figure 2:
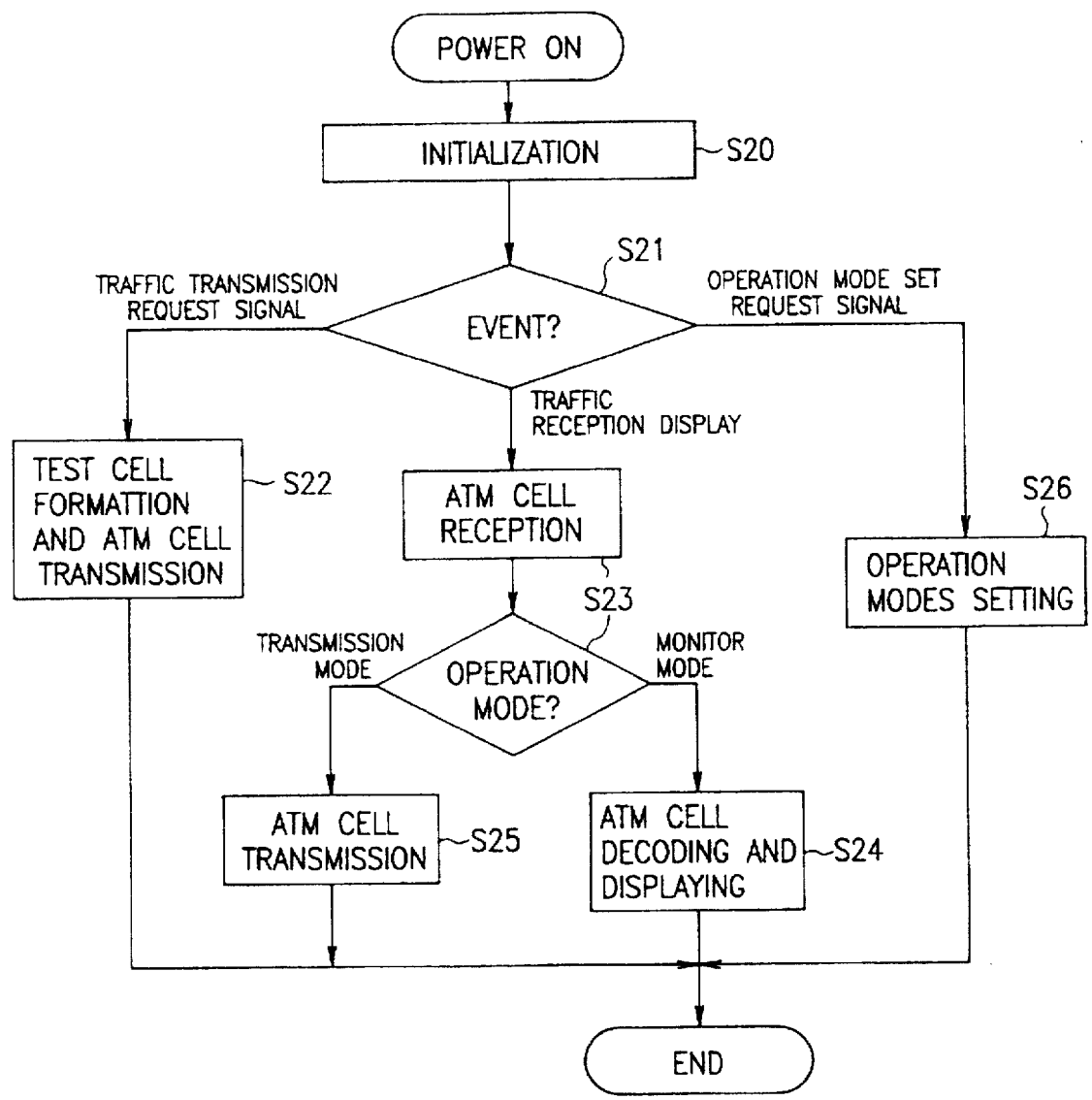
FIG. 2 presents a flowchart view explaining the test control block shown in Fig.1 in accordance with a preferred embodiment of the present invention.

FIG. 2 shows a flowchart explaining the operation of the test control block 1 in accordance with a preferred embodiment of the present invention.

The test control block 1, in response to a command signal by user, is used for setting the operation mode of the test apparatus, and receiving and transmitting the ATM cell for use in testing.

In step S20, the test control block 1 sets a basic mode which operates on system initial module to perform the initialization of hardware and software. In step S21, the test control block 1 waits out a test event.

In step S21, if a test cell traffic transmission request signal is input thereto, the process proceeds to step S22 where the test control block 1 formats the test cell into interface type and generates an ATM cell to the test traffic transmission block 2.

On the other hand, if an event representing reception of the ATM cell is received at step S23, the test control block 1 receives the ATM cell from the test traffic reception block 3 and checks an operation mode input thereto. In the step S23, if the operation mode is a monitor mode the process continues on to step S24 where the test control block 1 decodes the inputted ATM cell to display user interface. If the operation mode is a transmission mode, the process proceeds to step S6 where the test control block 1 sends the input ATM cell to the test function user block 5. Meanwhile, in step S21 if an operation mode set request event is input thereto, the operation modes of the test control block 1, the cable connecting block 4, the test traffic transmission block 2 and the test traffic reception block 3 are subsequently set in step S26.

In the meantime, there are several modes in the aforementioned operation mode, for example, an application mode, a traffic generation mode for measuring the performance thereof and a reception channel set mode for setting a measuring channel, wherein the application mode has two modes: one of which is a monitor application mode for receiving/re-transmitting traffic and the other is a system application mode for transmitting/receiving the traffics to test protocol.

Figure 3:
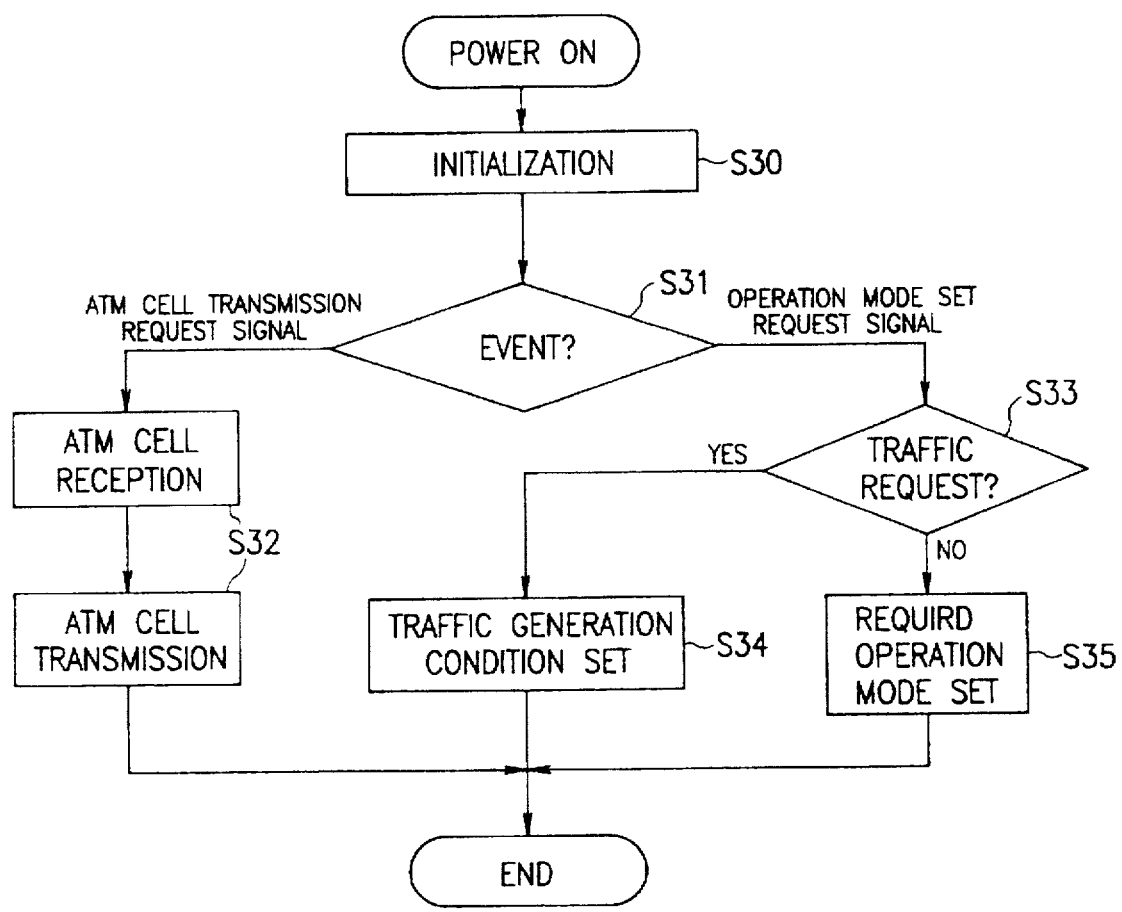
FIG. 3 represents a flowchart view exhibiting the test traffic transmission block shown in FIG. 1 in accordance with the present invention.

FIG. 3, shows a flowchart depicting the operation of the test traffic transmission block 2 in accordance with the present invention.

The test traffic transmission block 2, in response to an instruction signal generated by the test control block 1, serves to transfer an ATM cell for use in testing As shown in FIG. 3, a mode activating basically at a systheninitial module is set and then the hardware and software in the system are initialized in step S30. Thereafter, in step S31, the test traffic transmission block 2 waits to receive a test event. In the case of receiving an ATM cell transmission request event, the test traffic transmission block 2 receives the ATM cell provided from the test control block 1 and passes it to the line interface block 4, in step S32.

On the other hand, in step S31, if an operation mode set request event is input thereto, the process proceeds to step S33 where the test traffic transmission block 2 determines whether a traffic generation is requested. If a traffic generation is requested the process proceeds to step S34 wherein a traffic generation condition is set based on a generated bandwidth and ATM cell parameter to thereby provide traffic; and if not the process proceeds to step S35 wherein a required operation mode, for instance, a traffic generation interruption request and so on forth, is set.

Figure 4:
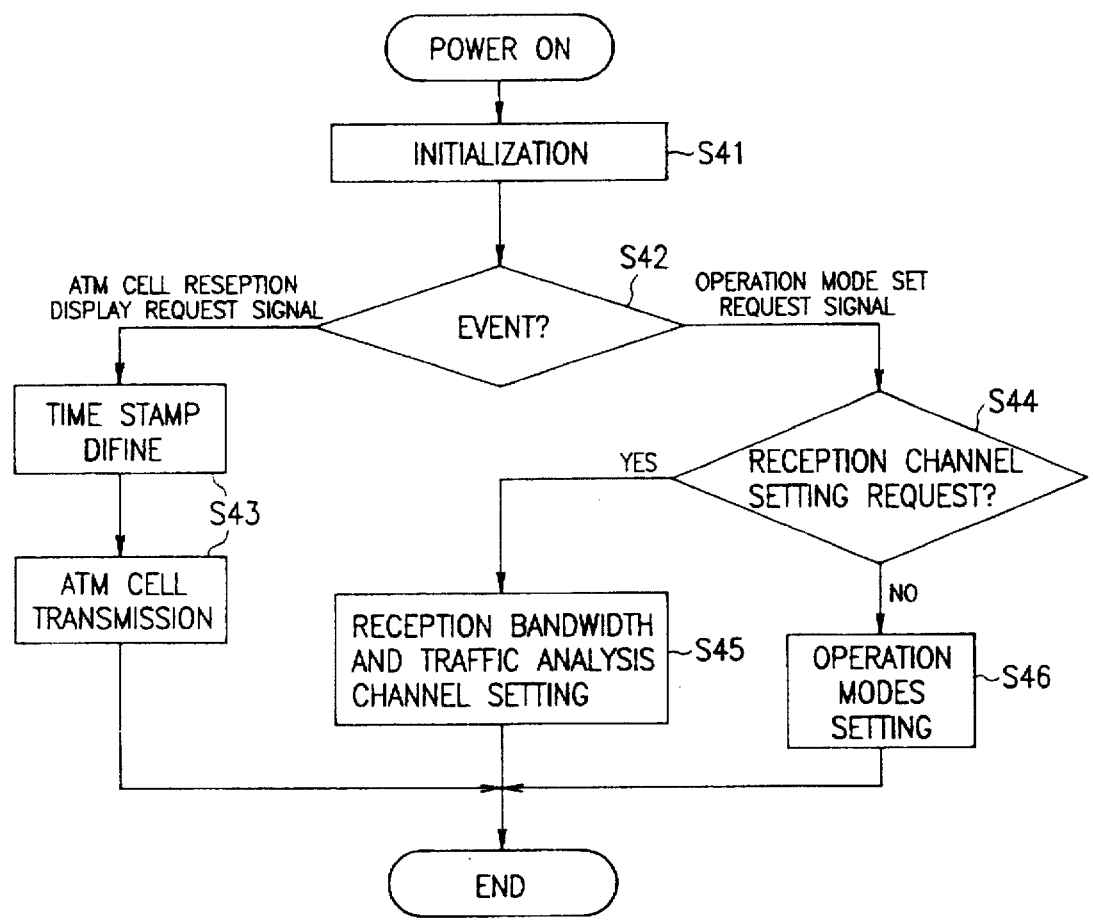
FIG. 4 illustrates a flowchart view showing the test traffic reception block shown in FIG. 1 in accordance with the present invention.

Turning to FIG. 4, there is provided a flowchart showing the operation of the test traffic reception block 3 in accordance with the present invention.

The test traffic reception block 3, in response to an instruction signal generated by the test control block 1, serves to receive an ATM cell for use in testing generated by the line interface block 4.

As shown in FIG. 4, a mode activated at a system initial module is set and then the hardware and software in the system are initialized in step S41. Thereafter, in step S42, the test traffic reception block 3 waits to receive a test event. In this case of receiving an ATM cell reception display event from the line interface block 4, the test traffic reception block 3 receives the ATM cell and defines a time stamp for displaying a reception time, and then passes the received ATM cell to the test control block 1, in step S43

Meanwhile in step S42, if an operation mode set request event for requesting a reception channel set from the test control block 1 is input thereto, the process proceeds to step S44 where the test traffic reception block 3 determines whether a reception channel set is requested. If a reception channel set is requested the process proceeds to step S45 wherein a traffic reception condition is set based on a reception bandwidth and ATM cell parameter to thereby perform a traffic analysis function; if not, the process proceeds to step S46 wherein a required operation mode, for instance, a channel set cancel request and so on forth, is set.

Figure 5:
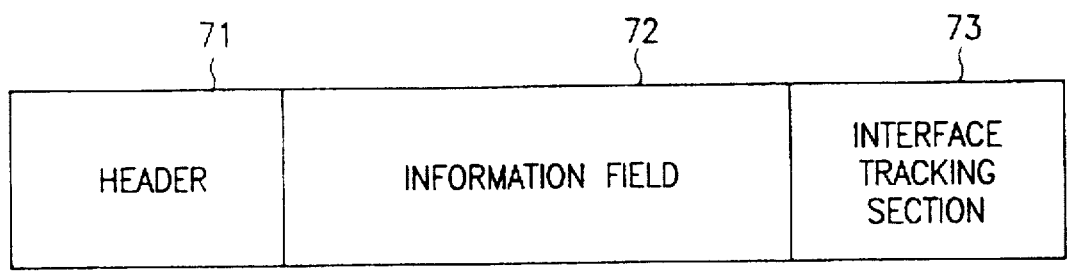
FIG. 5 shows a diagram presenting a frame structure between the test control block and the test traffic transmission and reception blocks.

FIG. 5 shows a format configuration diagram for a test frame to be applied in communication paths between the test control block 1 and the test traffic transmission block 2, and the test traffic reception block 3 in accordance with the present invention.

In the FIG. 5, a header 71 consists of an outer I/O port number, the sequence of an input cell, the time stamp and an ATM cell header information, VPI, VCI, GFC and CLP.

The information field 72 includes 48 octets which is data region of the ATM cell. The interface tracking section 73 includes a flag representing whether the frame is to be processed, wherein the flag is activated during the transmission of data and is deactivated during the reception of data.

Figure 6:
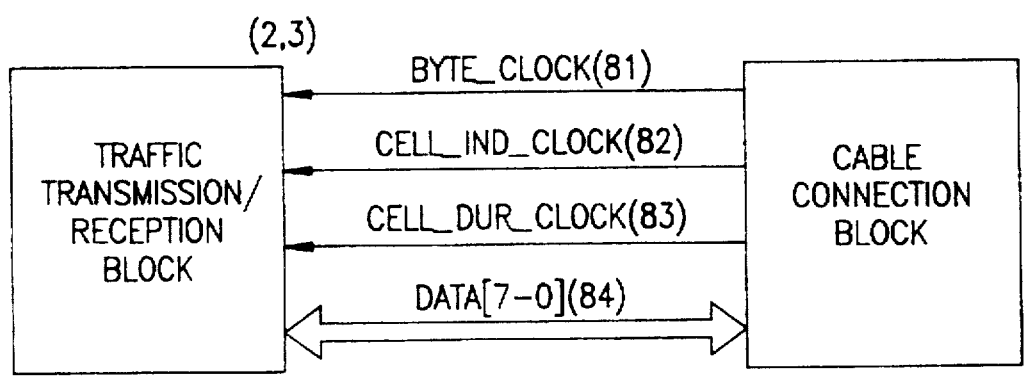
FIG. 6 provides an exemplary diagram for depicting operation between the test traffic transmission and reception blocks and a line interface block.

FIG. 6 shows a format configuration diagram for an interface to be applied in communication paths between the line interface block 4 and the test traffic transmission block 2, and the test traffic reception block 3 in accordance with the present invention.

First, a BYTE_CLOCK 81 represents a standard unit for transmitting/receiving the ATM cell as a serves clock. A CELL_IND_CLOCK 82 is a signal which serves to indicate the ATM cell has been reached at one byte clock. A CELL_DUR_CLOCK 82 denotes a duration signal during a reach time of the cell which is displayed for 53 byte clocks. A DATA[7-0] with 8 bit parallel bus is used as a transfer signal for an actual ATM cell data.

As demonstrated above, the present invention is capable of testing protocol and traffic in an apparatus to be connected with a broadband integrated services digital network(B-ISDN) user-network interface, to thereby provide test functions for ascertaining interoperability of protocol and traffic levels for a test-object system. Accordingly, it is possible to achieve a reduced development and testing time, and hence, to reduce cost for setting test conditions.

While the present invention has been described with respect to the particular embodiments, it will be apparent to those skilled in the art that various changes and modifications may be made without departing from the spirit and scope of the invention as defined in the following claims.

What is claimed is:

1. An apparatus for testing protocol and traffic levels in broadband integrated services digital network(B-ISDNs), comprising:

test control means for receiving a test cell traffic transmission request signal provided from a test function user part, formatting a cell to be transmitted, generating an ATM cell, receiving the ATM cell based on an ATM cell reception display signal, and controlling an operation mode to thereby test the protocol and the traffic levels;

test traffic transmission means for receiving an ATM cell generated by said test control means, outputting the received ATM cell, and setting an operation mode based on the operation mode set request signal provided from said test control means;

test traffic reception means for receiving an ATM cell which is synchronized with a byte clock in response to a received control signal, setting a time stamp for displaying the received time, processing the time stamp to said test control means, and setting an operation mode based on the operation mode set request signal provided from said test control means; and line interface means for receiving the ATM cell generated by the test traffic transmission means and outputting it to a plurality of ports in a line interface, receiving the ATM cell from the plurality of ports, and then synchronizing the ATM cell with a byte clock to thereby output the ATM cell to said test traffic reception means.

2. The apparatus according to claim 1, wherein an interconnection between the test function user part and the said control means is achieved through the use of a LAN, a communication path between said test control means and said test traffic transmission and reception means is provided by a system bus interface, an interconnection between said test traffic transmission and reception means and said line interface means is provided by an ATM cell bus interface, an interconnection between the line interface means and outside networks is provided by a line interface port interface, and wherein said line interface means is provided with a multiple number of cable connection ports to thereby increase a capacity of the test apparatus and includes various physical mediums including either a single mode or multi-mode optical fiber.

3. A method utilized in an apparatus for testing and traffic levels in broadband integrated services digital networks(B-ISDNS), wherein the apparatus includes test control means for receiving a test cell traffic transmission request signal provided from a test function user section, formatting a cell to be transmitted and generating an ATM cell, receiving the ATM cell based on an ATM cell reception display signal, and controlling an operation mode to thereby test the protocol and traffic levels; test traffic transmission means for receiving an ATM cell generated by the test control means, outputting the received ATM cell, and setting an operation mode based on the operation mode set request signal provided from the test control means; test traffic reception means for receiving an ATM cell which is synchronized with a byte clock in response to a received control signal, setting a time stamp for displaying the received time, processing the time stamp to the test control means, and setting an operation mode based on the operation mode set request signal provided from the test control means; and line interface means for receiving the ATM cell generated by the test traffic transmission means and outputting it to a plurality of ports in a line interface port interface, and receiving the ATM cell from the plurality of ports, and then synchronizing the ATM cell with a byte clock to thereby output it the test traffic reception means, said method comprising the steps of:

(a) setting a mode which operates on system initial module to initialize hardware registers and software variables of the test control means, receiving a test cell traffic transmission request signal, formatting a cell to be transmitted to thereby provide an ATM cell to the test traffic transmission means, receiving the ATM cell generated by the test traffic reception means and checking an operation mode input thereto, performing the operation of a corresponding mode, and receiving a operation mode set request signal to set operation modes of the test control means;

(b) setting a mode which operates on a system initial module to initialize hardware registers and software variables of the test traffic transmission means, receiving an ATM cell traffic transmission request signal generated by the test control means and passing the received ATM cell to the line interface means, and receiving a operation mode set request signal to thereby set operation modes of the test traffic transmission means; and (c) setting a mode which operates on a system initial module to initialize hardware registers and software variables of the test traffic transmission means, receiving an ATM cell generated by the line interface means, defining a time stamp for displaying a received time, passing the received ATM cell to the test control means, and receiving a operation mode set request signal to thereby set operation modes of the test traffic reception means.

4. The method according to claim 3, wherein said step(a) includes the sub-steps of:

(a1) setting a mode which operates at the system initial module to initialize hardware and software thereof, and waiting for a test event;

(a2) at the sub-step (a1), if a test cell traffic transmission request signal is input thereto, forming the test cell in an interface type and outputting an ATM cell to the test traffic transmission means;

(a3) at the sub-step (a1) if an event representing reception display of the ATM cell is input thereto from the test traffic reception means, checking an operation mode input thereto;

(a4) decoding the input ATM cell at the sub-step (a3) if the operation mode is a monitor mode and displaying it on user interface, and sending the input ATM cell to the test function user block if the operation mode is a transmission mode; and (a5) if an operation mode set request event is input at the sub-step (a1), subsequently setting the operation modes of the test control means, the line interface means, the test traffic transmission means and the test traffic reception means.

5. The method according to claim 3, wherein said step(b) includes the sub-steps of:

(b1) setting a mode which operates at the system initial module to initialize hardware and software thereof, and waiting for a test event;

(b2) if an ATM cell traffic transmission request signal is input at the sub-step (b1), receiving the ATM cell generated by the test control means and outputting the ATM cell to the line interface means; and (b3) receiving an operation mode set request signal at the sub-step (b1), wherein if the request signal is a traffic generation request signal, a traffic generation condition is defined based on a generated bandwidth and ATM cell parameter, and if the signal is another signal, a required function is performed.

6. The method according to claim 3, wherein said step(c) includes the sub-steps of:

(c1) setting a mode which operates at the system initial module to initialize hardware and software thereof, and waiting for a test event;

(c2) if an ATM test cell reception display even generated by the line interface means is input thereto at the sub-step (c1), receiving an ATM cell, defining a time stamp for displaying a reception time, and outputting the received ATM cell to the test control means; and (c3) receiving an operation mode set request signal for setting a reception channel at the sub-step (b1), wherein if the request signal is a reception channel set request signal, a traffic reception condition is defined based on a generated bandwidth and ATM cell parameter, and if the signal is another signal, a required function is performed.

* * * * *